Nov. 26, 1929.  J. W. WELSH  1,736,953

SPECTACLE TEMPLE AND METHOD OF MAKING THE SAME

Filed Jan. 11, 1924

Inventor:-
James W. Welsh.
by David Rines
Attorney:-

Patented Nov. 26, 1929

1,736,953

UNITED STATES PATENT OFFICE

JAMES W. WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK

SPECTACLE TEMPLE AND METHOD OF MAKING THE SAME

Application filed January 11, 1924. Serial No. 685,695.

The present invention relates to spectacle temples and to methods of making the same. The invention is more particularly related to cable temples of the composite-metal-and-non-metallic type.

Temples of the said type, as usually manufactured, consist of a comparatively rigid body portion provided with a reinforcing metal rod, and a comparatively flexible ear-hook portion. The ear-hook portion may comprise either a non-metallic tube mounted over the metal rod and cut into helical form, as disclosed, for example, in the patent to Welsh, No. 1,636,340, July 19, 1927, or one or more non-metallic strands wound around the rod, as disclosed, for example, in the patent to Clulee, No. 1,472,014, October 23, 1923. The junction between the body portion and the ear-hook portion is in both cases very weak; so much so, that if the ear-hook portion is purposely or accidentally subjected to a little undue strain, a permanent set will take place at the junction; and if the strain is beyond a given limiting value, the temple will actually break at the said junction.

It is therefore an object of the present invention to improve upon temples of the above-described character, to the end that the said junction shall be rendered as strong as other parts of the temple, but without impairing the flexibility of the temple. Other and further objects will be explained hereinafter and the nature of the invention will be particularly pointed out in the appended claims.

Figure 1:
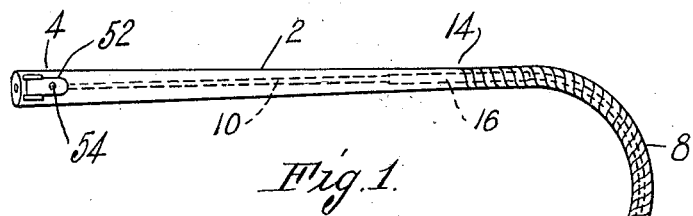
Figure 2:
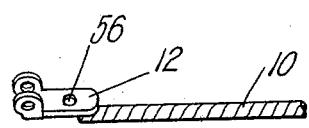
Figure 3:
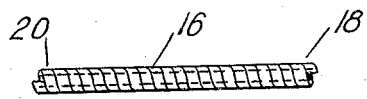
Figure 4:
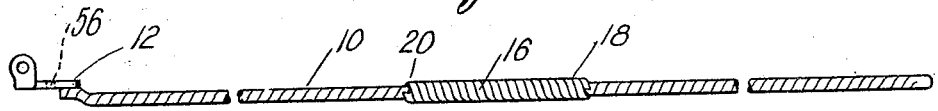
Figure 5:
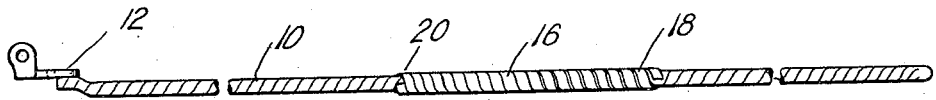

In the accompanying drawings, Fig. 1 is a view of a spectacle or eyeglass temple bar constructed according to a preferred embodiment of the invention; Fig. 2 is a fragmentary perspective view of a preferred reinforcing rod and hinge plate; Fig. 3 is a view of a reinforcing metal ribbon, wound into the form of a tube; and Figs. 4 and 5 illustrate steps in the manufacture according to the method of the present invention.

The illustrative temple comprises a tube 2 of non-metallic material, like celluloid, zylonite and the like. In order to avoid circumlocution of language, such materials will hereinafter be referred to under the single term "celluloid". The main body portion or butt of the tube 2 tapers from the larger or forward end 4 towards the end 6 of smaller diameter. The portion of smaller diameter of the tube 2 is cut into the form of a helix, as shown at 8, which renders it very yielding. The larger end 4 of the butt is provided with a recess 52 to receive a hinge plate 12 by which the temple may be pivotally connected to a lens-holding frame (not shown). A metal reinforcing rod 10 is inserted in the tube through the recess 52, and the hinge plate 12, previously soldered or otherwise secured to the rod 10, is seated in the recess 52 and is secured therein in any desired manner, as by means of a rivet or screw 54 that extends through an opening 56 in the hinge plate. The tapered, helically cut portion of the tube 2, with the metal rod 10 inserted therein, is then bent into the desired temple shape, shown in Fig. 1 as an ear hook. Temples of this type, as hitherto constructed, have been very weak at the junction 14 between the body portion and the ear-hook portion of the temple.

To eliminate this weakness, according to the present invention, the reinforcing rod 10 is protected or stiffened at the junction 14 by a strand of wire 16, coiled into the form of a tube, and mounted over the rod 10 at the weak spot. This stage of the manufacture is illustrated in Fig. 4. The rod is then subjected to the action of a reducing machine, which lengthens out the coil 16 and works it into tighter relation to the rod 10. This stage is illustrated in Fig. 5. As is also illustrated in Fig. 5, the reducing machine acts to separate the turns of the coil 16 more at the rear end, as shown at 18, than at the forward end 20 of the coil 16. This increased separation renders the rod gradually more yielding at the rear end 18 of the coil 16 than at the forward end 20, adding to the flexibility of the temple, without detracting from its strength. It is in this condition that the rod is inserted into the bore of the tube 2 through the recess 52 with a part of the reinforced portion of the rod in the butt of the tube and the remainder projecting rearward thereof, into the helical coil portion 8.

The invention is by no means restricted to the exact embodiment thereof that is herein illustrated and described. Modifications will readily occur to persons skilled in the art, and all such are intended to be embraced within the spirit and scope of the invention as defined in the appended claims.

What is claimed is:

1. The method of making an article of the class described that comprises mounting a yielding rod in a tube so that a portion of the rod is disposed within the tube at one end of the tube, working the tube into tight relation to the rod while maintaining the said portion of the rod disposed within the tube at the said end of the tube, and rendering the said end of the tube more yielding than another portion of the tube, whereby the said end of the tube with the said portion of the rod disposed therein is more yielding as a unit than other portions of the tube with the rod mounted therein.

2. The method of making an article of the class described that comprises mounting a coil upon a rod, and working the coil into tight relation to the rod and separating the turns of the coil more at one end of the coil than at the other end of the coil.

3. The method of making a spectacle temple that comprises mounting a tube upon a rod, working the tube into tight relation to the rod, rendering one end of the tube more yielding than the other end, mounting non-metallic material upon the rod, and bending the rod at the more yielding end of the tube into the shape of a temple.

4. The method of making a spectacle temple that comprises mounting a coil upon a rod, working the coil into tight relation to the rod and separating the turns of the coil more at one end of the coil than at the other end of the coil, mounting the rod in a non-metallic tube a portion of which is helically cut, and bending the rod at the coil into the shape of a temple.

5. A spectacle temple comprising a comparatively rigid non-metallic portion joined to a comparatively flexible non-metallic portion, the temple having a reinforcing rod, and a reinforcing coil mounted upon the rod at the junction between the comparatively rigid portion and the comparatively flexible portion, the coil being in tight relation to the rod.

6. A spectacle temple comprising a comparatively rigid non-metallic portion joined to a comparatively flexible non-metallic portion, the temple having a reinforcing rod, and a reinforcing coil mounted upon the rod at the junction between the comparatively rigid portion and the comparatively flexible portion, the turns of the coil being separated more near the comparatively flexible portion than near the comparatively rigid portion of the temple.

7. A spectacle temple comprising a non-metallic tubular body portion, and an ear-hook portion, a reinforcing rod in the body portion, the ear-hook portion comprising a helical coil of non-metallic material mounted about the reinforcing rod, and a reinforcing coil mounted upon the rod at the junction between the body portion and the ear-hook portion, the reinforcing coil being in tight relation to the rod, and the turns of the reinforcing coil being separated more near the ear-hook portion than near the body portion.

8. A spectacle temple comprising a comparatively rigid non-metallic portion joined to a comparatively flexible non-metallic portion, the temple having a reinforcing rod, and a reinforcing coil mounted upon the rod at the junction between the comparatively rigid portion and the comparatively flexible portion.

9. The method of reinforcing weak joints in spectacle-temple rods that comprises mounting the temple rod in a tube so that the portion of the rod in the neighborhood of the weak joint is covered by the tube, working the tube into tight relation to the rod, and rendering the tube more yielding at one end than at another portion of the tube, whereby the temple rod is both reinforced at the weak joint and rendered more yielding at the said end of the tube than at other portions of the temple rod.

10. A spectacle temple comprising a one-piece tubular body portion and helically cut ear-hook portion, a reinforcing rod in the tube, and means for reinforcing the temple at the junction between the body portion and the ear-hook portion.

11. The herein described art of making eyeglass temple bars, which consists in spirally coiling a metal wire member, applying a reinforcing sleeve about the exterior of a portion of said coil to stiffen the same, shaping a portion of said coil to a curved contour, placing a substantially rigid celluloid covering about a part of said stiffened portion, and placing a flexible celluloid covering about the remainder of said stiffened portion and about an unstiffened portion of said coil.

12. In construction for eyeglass temple bars, in combination, a main body portion of celluloid joined at its forward end to a lens mounting, a metallic member extending rearwardly from said main body portion and comprising a spirally coiled wire member having a portion stiffened by a reinforcing metal sleeve thereabout, and a flexible covering of celluloid about said metallic member, said metal sleeve having an outer diameter less than that of the rear end of said celluloid main body portion and the forward end portion of the flexible celluloid covering exterior thereof merging smoothly into said main body portion.

13. In eyeglass construction, a temple bar comprising, in combination, a relatively rigid forward portion and a relatively flexible rear portion, said rear portion including a coiled metal wire member entering the rear end of said forward portion, and a stiffening metal sleeve positioned about the part of said coiled member immediately rearwardly of the rear end of said relatively rigid forward portion.

14. A spectacle temple comprising a forward comparatively rigid celluloid body portion joined to a rear ear-hook portion in the form of a helical coil of celluloid, a comparatively flexible metal rod in the ear-hook portion and extending into the body portion, whereby the ear-hook portion of the temple is flexible compared to the body portion, and a separate reinforcing metal member for the rod mounted circumferentially about and tightly engaging the exterior surface of a portion of the rod at the junction between the body portion and the ear-hook portion, the forward portion of the tightly engaging separate member being mounted in the body portion and the remainder of the tightly engaging separate member being mounted in the ear-hook portion.

15. The method of making a spectacle temple that comprises applying a separate reinforcing metal member circumferentially about the exterior surface of a portion of a comparatively flexible metal rod so that a second portion of the rod extends rearward beyond the rear end of the separate member, compressing the separate member into tight circumferential engagement with the exterior surface of the rod to reinforce the rod and rendering the said rear end of the separate member with the rod therein more yielding as a unit than the forward part of the separate member with the rod therein, and placing a comparatively rigid celluloid body portion about the forward part of the compressed member and a helical celluloid coil about the remainder of the compressed member and about the said second portion of the rod.

16. In a spectacle temple, a flexible metal rod, and a separate reinforcing metal member for the rod mounted circumferentially about and tightly engaging the exterior surface of a portion of the rod, a second portion of the rod extending rearwardly beyond the rear end of the separate member, the rear end of the separate member being more yielding than the forward part of the separate member, whereby the rear end of the tightly engaging member with the portion of the rod engaged thereby is less flexible as a unit than the second portion of the rod but more flexible as a unit than the forward part of the tightly engaging member with the part of the rod engaged by the said forward part.

17. The method of making a spectacle temple that comprises applying a separate reinforcing metal member circumferentially about the exterior surface of a portion of a comparatively flexible metal rod so that a second portion of the rod extends rearward beyond the rear end of the separate member, compressing the separate member into tight circumferential engagement with the said exterior surface, and placing a comparatively rigid celluloid body portion about the forward part of the compressed member and a helical celluloid coil about the remainder of the compressed member and about the said second portion of the rod.

18. A spectacle temple comprising a forward comparatively rigid celluloid body portion joined to a rear ear-hook portion in the form of a helical coil of celluloid, a comparatively flexible metal rod in the ear-hook portion and extending into the body portion, whereby the ear-hook portion of the temple is flexible compared to the body portion, and a separate reinforcing metal member for the rod mounted circumferentially about and tightly engaging the exterior surface of a portion of the rod at the junction between the body portion and the ear-hook portion, the forward part of the tightly engaging separate member being mounted in the body portion and the remainder of the tightly engaging separate member being mounted in the ear-hook portion, the rear end of the tightly engaging member being more yielding than the forward part of the tightly engaging member, whereby the rear end of the tightly engaging member with the portion of the rod engaged thereby is less flexible as a unit than the remaining portion of the rod in the ear-hook portion but more flexible as a unit than the forward part of the tightly engaging member with the part of the rod engaged by the said forward part.

19. In eyeglass construction, a temple bar comprising, in combination, a forward relatively rigid main body portion of celluloid, a coiled celluloid portion extending rearwardly from the rear end of said main body portion, a flexible metallic member within said coiled celluloid portion extending substantially throughout the entire length thereof and entering the rear end of said main body portion, and tubular metallic stiffening means positioned about said flexible metal member within a part of said coiled celluloid portion immediately adjacent to the rear end of said main body portion, said tubular stiffening means extending also into the rear end of said main body portion.

20. The method of making a spectacle temple that comprises applying a separate reinforcing member circumferentially about the exterior surface of a portion of a rod so that a second portion of the rod extends rearward beyond the rear end of the separate member, compressing the separate member into tight circumferential engagement with the said exterior surface of the rod, and placing a comparatively rigid celluloid body portion about the forward part of the compressed member and a helical celluloid coil about the remainder of the compressed member and about the second portion of the rod.

21. A spectacle temple comprising a forward non-metallic portion joined to a rear non-metallic portion, the temple having a reinforcing rod disposed within the non-metallic portions, and a reinforcing tube in which the rod is tightly mounted, one portion of the tube being disposed in the forward non-metallic portion and a second portion of the tube being disposed in the rear non-metallic portion.

22. The herein described art of making eyeglass temple bars, which consists in spirally coiling a metal wire member, placing a metal sleeve over a portion of said coil, forcing said sleeve inwardly to compress the portion of said coil therein and to stiffen the same, shaping an unstiffened portion of said coil to a curved contour, placing a substantially rigid celluloid covering about a part of said stiffened portion, and placing a coiled celluloid covering about the remainder of said stiffened portion and about said unstiffened portion.

23. In eyeglass construction, a temple bar comprising, in combination, a forward relatively rigid main body portion of celluloid, a coiled celluloid portion extending rearwardly from the rear end of said main body portion, a metal tube within said coiled celluloid portion extending through a portion only thereof adjacent the rear end of said main body portion, and a coiled metal wire member entering said tube and extending rearwardly thereof through said coiled celluloid portion.

24. In eyeglass construction, a temple bar comprising, in combination, a forward relatively rigid main body portion of celluloid, a coiled celluloid portion extending rearwardly from the rear end of said main body portion, a flexible metallic member within said coiled celluloid portion extending substantially throughout the entire length thereof and entering the rear end of said main body portion, and tubular metallic stiffening means positioned about said flexible metal member within a part of said coiled celluloid portion immediately adjacent to the rear end of said main body portion.

25. In eyeglass construction, a temple bar comprising, in combination, a relatively rigid forward portion and a relatively flexible rear portion, said rear portion including a coiled metal wire member joined to said relatively rigid forward portion, a stiffening metal sleeve positioned about a portion of said coiled member and extending along the same rearwardly of the rearmost point of connection between said relatively rigid forward portion and said coiled member, and a flexible covering of celluloid joined at its forward end to said relatively rigid forward portion and extending about said sleeve and said coiled wire member.

In testimony whereof, I have hereunto subscribed my name this 7th day of January, 1924.

JAMES W. WELSH.